July 20, 1954  F. R. SEAVEY  2,684,287
REACTION APPARATUS
Filed May 26, 1950  2 Sheets-Sheet 1
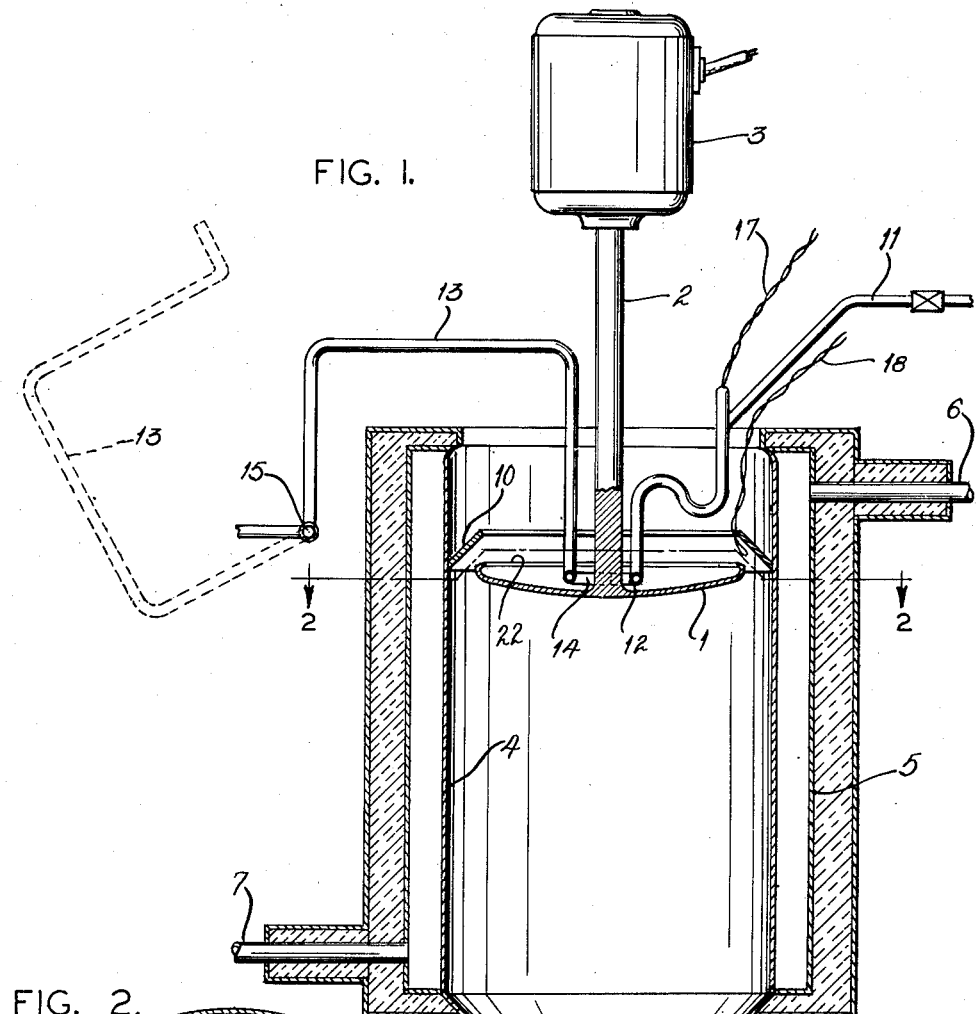
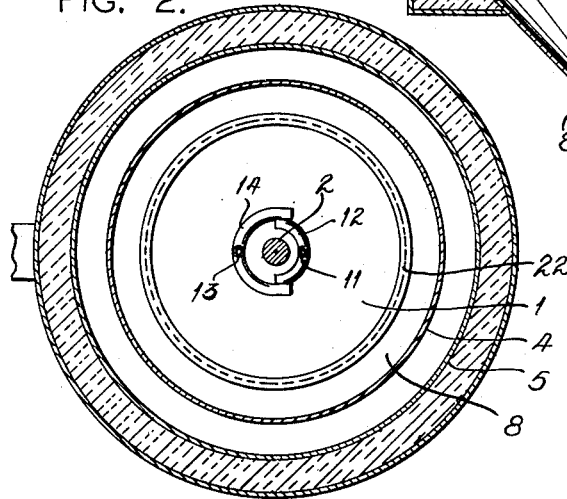
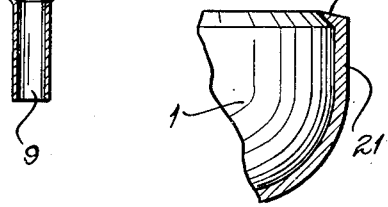
INVENTOR:
FREDERICK R. SEAVEY
BY Bruninga and Sutherland
ATTORNEYS.

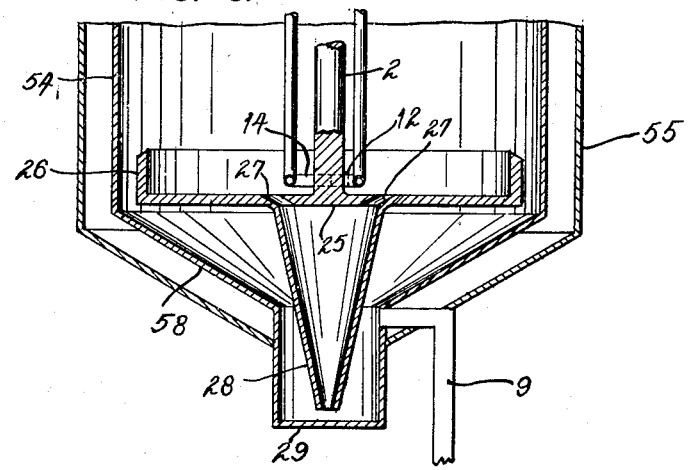
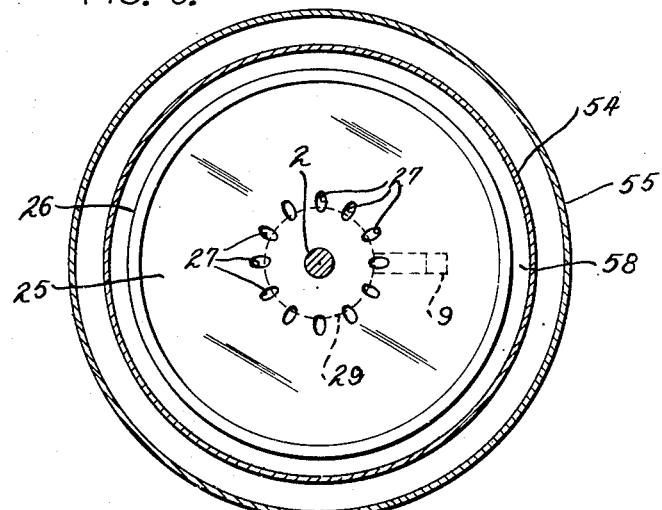

Patented July 20, 1954

2,684,287

UNITED STATES PATENT OFFICE 2,684,287

REACTION APPARATUS

Frederick R. Seavey, Alton, Ill., assignor to Olin Industries, Inc., East Alton, Ill., a corporation of Delaware Application May 26, 1950, Serial No. 164,358

4 Claims. (Cl. 23—266)

This invention relates generally to continuous reaction apparatus, and particularly to an apparatus suitable for the nitration of glycerine, aromatic hydrocarbons, glycols, and for the mixing and dilution of acids and alkalis, and for the manufacture of ethyl bromide from alcohol including the step of rapid mixture of alcohol and sulphuric acid, and for the preparation of sulphonic acids, such as benzene mono-sulphonic acid, in the preparation of azo-dyes, and the like, continuously.

The nitration of glycerine takes place practically instantaneously upon contact between glycerine and nitrating acids of the proper compositions, but in order to accomplish the nitration efficiently, it is important that the acid and glycerine be mixed quickly and uniformly, else the yield is poor. If mixing is not accomplished rapidly and uniformly, local overheating occurs, causing part of the glycerine or nitroglycerine to decompose, thus reducing the yield. Nitroglycerine also decomposes when in contact with acid, the rate of such decomposition being influenced by the temperature. The higher the temperature, the more rapid the decomposition. This decomposition also reduces the yield. It is thus desirable in a nitrator to have only a very small hold-up of the reaction products so that said reaction products can quickly be delivered to the next step of the process where the nitroglycerine will be separated from the acid, neutralized, and thus stabilized to prevent its further decomposition.

The apparatus which has heretofore been proposed in an effort to produce a continuous process of nitrating glycerine has involved, like in the batch processes, prolonged exposure of masses of nitroglycerine and acid together.

The object of the present invention is to provide an apparatus for nitrating glycerine and the like, wherein the reactants may be uniformly mixed immediately upon contact and maintained in contact substantially only for the very brief interval of time required to accomplish the reaction.

Other objects will become apparent to those skilled in the art when the following description is read in connection with the accompanying drawings, in which:

Figure 1 is a longitudinal sectional view of a nitrating apparatus constructed in accordance with the present invention;

Figure 2 is a sectional view taken along line 2—2 of Figure 1;

Figure 3 is an enlarged detail view showing the preferred contour for the rim portion of a spinning dish constituting a part of the nitration apparatus;

Figure 4 is a longitudinal sectional view of a spinning dish illustrating another embodiment of this invention;

Figure 5 is a longitudinal sectional view of a spinning dish assembly illustrating another embodiment of this invention; and Figure 6 is a plan view of the spinning dish assembly illustrated in Figure 5.

In accordance with the present invention, an apparatus of the character described consists essentially of a dish spinning about a vertical axis, and located within a cylindrical heat-exchanging wall. The reactant materials, for example, glycerine and nitrating acid, are separately introduced near the center of the rotating dish in such manner that the respective materials are caused to move past and through each other. In order to assure that such mixing occurs, the spinning dish of the present invention has its upper surface (upon which the reactants are delivered) configurated so that, in moving from the center of the dish toward the periphery, the materials must travel uphill, and centrifugal force tends to force them into contact with the dish surface.

To further assure thorough mixing of the reactants, to the end that molecular contact be as complete as possible, the apparatus of the invention permits advantage to be taken of differences in the specific gravity of the reactants. To accomplish this, the reactants may be delivered onto the dish in such manner that the differential in specific gravity tends to cause one reactant to pass through the other. For example, if the reactant having the lower specific gravity be deposited upon the dish at a locus radially inward from the locus at which the heavier reactant is deposited, the latter reactant will be deposited upon a film of the former (already on the dish), and centrifugal force (as well as gravity, when the reactants are deposited downwardly on the dish) will tend to cause the reactants to pass through each other. Depending upon the reactants and other conditions involved, and particularly upon their relative viscosity, the horizontal distance through which they travel on the dish, and the speed of rotation, either the heavier or the lighter reactant may be deposited at the most radially inward locus, or at the same radius or through a common orifice, whichever appears to effect the most complete mixing under the circumstances.

It is further contemplated that the spinning dish be configurated so as to maintain a thin annular layer of reactant within the periphery of the dish. The configuration is preferably such that the thin layer thus maintained is of lesser dimension in the radial direction than in the axial dimension. This not only delays the movement under centrifugal force, but tends to produce a centrifugal separation whereby the annular layer just referred to is rich in the heavier of the reactants present and held so that the molecules thereof may contact, and react with, any unreacted molecules of the lighter reactant, as they travel past. Alternatively (or in addition thereto), the apparatus may be equipped to return part of the discharge from the dish (in the nitration of glycerine, the return fraction is preferably rich in the heavier reactant) and redeposit it upon the dish for mixture with fresh reactants.

The invention especially contemplates that the materials discharged from the spinning dish be intercepted by a heat-exchange wall formed of a compatible material having a relatively high thermal conductivity and arranged so that, while its one surface is contacting the reaction products discharged from the spinning dish and passing them downwardly, the opposite surface of the wall is being continuously contacted by heat-exchange medium, in order thereby to remove heat from, or add heat to, the reaction products. When the reaction is exothermic, as in the case of nitrating glycerine, the heat-exchange medium is a refrigerant.

The apparatus of the present invention is characterized in operation by the feature that it continuously discharges the products of reaction without permitting any substantial quantity of them to accumulate in a pool at any time. Where the reactants or reaction products are explosive, the hazard is thus greatly reduced. Such small increments as from time to time are flowing downwardly over the refrigerated wall, and such increments as may, at any interval, be moving across the spinning dish present no substantial hazard.

Referring now to the drawings for an illustrative embodiment of the invention, the apparatus may consist of a dish 1 mounted upon a vertical shaft 2, at the upper end of which is an explosion-proof motor 3. Arranged concentrically about the dish 1 is a cylindrical wall 4 of stainless steel, or other material, which has a relatively high thermal conductivity, and which is compatible on the one side with the products of the reaction to be carried out, and compatible on the other side with the heat-exchange medium to be used. The wall 4 extends vertically, or nearly so, and is free of associated parts which would cause fluids passing thereover to accumulate in static pools.

Surrounding the wall 4 is a jacket 5, to which is connected a heat-exchange medium inlet pipe 7 and an outlet pipe 6 therefor. The arrangement is such that heat-exchange medium from a suitable source may be continuously flowed through the interspace between the wall 4 and the jacket 5, thereby to bring the materials passing thereover to a predetermined temperature. With the outlet pipe arranged at the top, and the inlet pipe at the bottom, as shown, the apparatus is best adapted for uses where the heat-exchange medium is a refrigerant, but it will be understood that the pipe 7 may, where desirable, be the outlet for the heat-exchange medium, and the pipe 6 the inlet for the heat-exchange medium.

Beneath the wall 4, a conical portion 8 is arranged to receive the reaction products and pass the same, without interruption, to a discharge tube 9.

An inclined annular baffle 10 may be mounted upon the interior wall 4 in position such as to deflect the materials discharged from the dish 1, and prevent splashing.

From a suitable source, not shown, the heavier reactant is delivered through a conduit 11 and deposited upon the upper surface of dish 1 from arcuate header 12, the lower side of which is provided with perforations preferably near each end thereof, so that streams of reactant are delivered to the dish 1 on substantially opposite sides of the center thereof. Similarly, from a suitable supply, not shown, a conduit 13 delivers another reactant to a header 14 for deposit upon the dish 1. The member 14 is similar in structure to the member 12, but of greater radius, so that the streams of lighter reactant are deposited upon the dish 1 radially outward from the locus at which the streams of heavier reactant are deposited.

As shown, the conduit 13 is provided with a swivel connection 15 whereby it may be moved from the position shown in full lines to the position shown in dotted lines, to prevent dripping reactant into the dish when the equipment is shut down or when emergencies require immediately interrupting the flow of reactant. One or both of the conduits 11 and 13 may be provided with a quick interruption device of the swivel or other suitable type.

Suitable temperature measuring and control devices, such as thermo-couples 17 and 18, may be applied where and as needed in the apparatus as, for example, in the supply line 11 and beneath the baffle 10.

Referring to Figure 3 of the drawings, it will be noted that the dish 1 has a vertically extending rim 21 at its periphery and that the upper edge of the rim 21 is provided with an inwardly extending lip 22. With the reentrant lip 22, a radially thin layer of reacting materials is trapped on the inner periphery of the rim 21, while the dish is rotating. The trapment of a layer of reacting materials at this point introduces a desired lag in the movement of the reactants across and from the dish 1. Such a lag is very slight, but nonetheless sufficient to assure intimate contact of the reactants. Furthermore, the heaviest component present on the dish will tend to collect as the radially outermost increment of the layer within the rim 21, which is advantageous in such reactions as the nitration of glycerine.

In the operation of the apparatus as illustrated by the nitration of glycerine, an appropriate mixture of nitrating acid is introduced through conduit 11 and header 12, concurrently with the introduction of glycerine through conduit 13. As the dish 1 spins, the glycerine and nitrating acid are impelled outwardly under centrifugal force, and thrown off the dish across the top of lip 22. In the process, a thin annular layer of material will collect within rim 21 and below lip 22. Due to the greater specific gravity of the acid, the material in the layer just mentioned will be rich in nitrating acid, if any remains unreacted in its travel across the floor of the dish. The maintenance of such a thin film of acid-rich material within the periphery thus assures that, with proper regulation of the input, no substantial amount of unnitrated glycerine will emerge from the dish 1. As the materials emerge from the dish 1, they are deposited upon the interior wall of cylinder 4 which, as hereinbefore pointed out, is a heat-exchange medium, and in this case the wall 4 is chilled. The nitroglycerine deposited upon the wall 4 passes downwardly thereover, and is immediately discharged through tube 9.

In Figure 4 of the drawings, a modified form of dish is shown. In this embodiment the floor 101 of the dish is flat, and provided with a rim 121 having a lip 122, like the rim 21 and the lip 22 of the previous embodiment. Exteriorly of the rim 121 a further rim 123 is provided. Like the rim 121, the rim 123 is provided with a reentrant lip 124. In the operation of this embodiment, two annular layers of material are maintained on the dish, one within the rim 121 and the other within the rim 123, both layers being rich in the heavier reactant. Each of the rims 121 and 123, with its annular layer of reactants, effects a lag in the movement of the materials across and from the dish. The added rim 123 assures thorough mixing of the reactants.

In the embodiment illustrated in Figures 5 and 6, a spinning dish 25, with a rim 26, is mounted on shaft 2. The dish 25 has a truncated hollow cone 28 depending therefrom, concentric with shaft 2. A series of perforations 27 extend through dish 25 and communicate with the interior of cone 28. In operation, the reactants are separately fed onto the dish 25 from the nozzles 12 and 14, respectively, and thorough mixing of the reactants is accomplished on the dish surface and at the rim 26, as described in the foregoing for dish 1 and rim 21. While in the embodiment shown the rim 26 is not provided with an inturned lip, as in the previous embodiments, it will be understood that such an inturned lip may be provided. As shown, however, the sharp, angular relation between the lip 26 and the lower edge of the dish 25, provides for the retention of an annular layer of reactants within the lip 26. As the reaction products are expelled by centrifugal force over the rim 26, they are intercepted by a wall 54, and pass freely downward thereover onto a conical portion 58. In this embodiment, a jacket 55 is provided about not only the cylindrical portion 54, but also about the conical portion 58 of the heat-exchanging wall. Suitable inlets and outlets are provided for the heat-exchange medium, which is circulated in the space between jacket 55 and walls 54 and 58.

At the bottom of the conical portion 58, and arranged to receive the reaction products flowing downwardly therefrom, a sump 29 is arranged and connected with discharge tube 9.

The cone 28, which revolves as part of the dish 25, has its lower and smaller end immersed in the reaction products within the sump 29, and accordingly some of the materials are centrifugally drawn from the sump and returned to the dish. While in the case of nitroglycerine manufacture the sump 29 is preferably small, in situations where it is less important to immediately separate residual reactant from the reaction product, the sump may be as large as desired. The portion of the reaction products in the sump 29, which under centrifugal force climb the inner wall of the cone 28, is emitted through the perforations 27 onto the surface of the dish 1, whereupon it mixes with the freshly added reactants, tending to dilute them and adsorb some of the heat of reaction. The cone 28 therefore provides a means for recirculating a portion of the reaction products within the apparatus while the remainder of the reaction products overflow from the receptacle 29 through the discharge tube 9. When the sump 29 is large (particularly broad) enough, an effective gravity separation may be effected therein; the closer the lower end of cone 28 approaches the bottom of the sump, the richer will be the content of heavy component in the returns. The location of the discharge tube high or low (with controlled orifice) also affects the gravity separation. With the sump 29 as small as shown in the drawing, full advantage of the potential gravity separation is sacrificed in favor of maximum safety. Nonetheless, with the bottom of cone 28 near the bottom of the sump and the discharge tube 9 at the top thereof, advantage is taken of any gravity separation which does occur in the sump, so that returns to dish 25 are rich with the heavier component.

In lieu of cone 28, the member depending into sump 29 may be a hollow inverted pyramid, or the member may be solid with channels diverging upwardly.

From the foregoing description, those skilled in the art should readily understand the construction and operation of the apparatus. While the apparatus has been disclosed with particular reference to the nitration of glycerine, it is to be distinctly understood that references to the nitration of glycerine have been merely for the purpose of facilitating the disclosure, and that the use of the apparatus is not limited to such reaction. On the contrary, the apparatus may be used in any practically instantaneous reaction where it is essential or desirable to intimately contact the reactants quickly, and to immediately discharge them from the reaction vessel once they are contacted.

Having thus described the invention, what is claimed and desired to be secured by Letters Patent is:

1. Apparatus for nitrating glycerine and the like comprising a cylindrical wall whose axis is substantially vertical, said wall having high thermal conductivity and being provided with a jacket through which refrigerant is run, said refrigerant being in contact with the outside surface of said wall; a rotatable shaft supported and driven from above and extending downwardly within and coaxially with said wall; a disk shaped reactor mounted concentrically on said shaft intermediate the axial limits of said wall and supported and rotated solely by said shaft, said reactor having a peripheral upwardly extending rim over which reaction products are discharged; an acid introduction pipe having a perforated U-shaped header extending about the shaft adjacent the upper surface of the reactor; a glycerine introduction pipe having a perforated U-shaped header extending about the shaft radially outwardly from the header of the acid introduction pipe and adjacent the upper surface of the reactor; an annular lip extending inwardly from the cylindrical wall adjacent and above the peripheral rim of the reactor; and means withdrawing reaction products after they have flowed down said refrigerated wall, whereby said wall is maintained free of accumulation of reaction products.

2. Apparatus for nitrating glycerine and the like comprising a cylindrical wall whose axis is substantially vertical, said wall having high thermal conductivity and being provided with a jacket through which refrigerant is run, said refrigerant being in contact with the outside surface of said wall; a rotatable shaft supported and driven from above and extending downwardly within and coaxially with said wall; a disk shaped reactor mounted concentrically on said shaft intermediate the axial limits of said wall and supported and rotated solely by said shaft, the upper surface of said reactor having its perimeter at a higher elevation than its center; an acid introduction pipe having a discharge opening adjacent the shaft and the upper surface of the reactor; a glycerine introduction pipe having a discharge opening spaced from the opening of the acid introduction pipe but adjacent the shaft and the upper surface of the reactor, whereby nitrating acid and glycerine are introduced to the upper surface of the reactor near the center thereof, react as they move out in a thin sheet, and the reaction products are discharged from said reactor solely over the perimeter thereof onto the refrigerated wall, said glycerine introduction pipe being mounted outside the wall on a horizontal swivel, whereby the pipe with its discharge opening may be swung out of the confines of the wall; and means withdrawing reaction products after they have flowed down said refrigerated wall, whereby said wall is maintained free of accumulation of reaction products.

3. Apparatus for nitrating glycerine and the like comprising a cylindrical wall whose axis is substantially vertical, said wall having high thermal conductivity and being provided with a jacket through which refrigerant is run, said refrigerant being in contact with the outside surface of said wall; a rotatable shaft supported and driven from above and extending downwardly within and coaxially with said wall; a disk shaped reactor mounted concentrically on said shaft intermediate the axial limits of said wall and supported and rotated solely by said shaft, the upper surface of said reactor having its perimeter at a higher elevation than its center; said reactor being provided with a concentric, depending, open-ended, hollow, downwardly convergent, truncated cone and with radially outwardly extending passages from the upper surface of the reactor to the inside of the cone; a container positioned and arranged to collect reaction products flowing from the wall, said container having an overflow port and said cone extending within said container to a point below said overflow port; an acid introduction pipe having a discharge opening adjacent the shaft and the upper surface of the reactor; a glycerine introduction pipe having a discharge opening spaced from the opening of the acid introduction pipe but adjacent the shaft and the upper surface of the reactor, whereby nitrating acid and glycerine are introduced to the upper surface of the reactor near the center thereof, react as they move out in a thin sheet, and the reaction products are discharged from said reactor solely over the perimeter thereof onto the refrigerated wall; and means withdrawing reaction products after they have flowed down said refrigerated wall, whereby said wall is maintained free of accumulation of reaction products.

4. Apparatus for nitrating glycerine and the like comprising a cylindrical wall whose axis is substantially vertical, said wall having high thermal conductivity and being provided with a jacket through which refrigerant is run, said refrigerant being in contact with the outside surface of said wall; a rotatable shaft supported and driven from above and extending downwardly within and coaxially with said wall; a disk shaped reactor mounted concentrically on said shaft intermediate the axial limits of said wall and supported and rotated solely by said shaft, the upper surface of said reactor having its perimeter at a higher elevation than its center; an acid introduction pipe having a discharge opening adjacent the shaft and the upper surface of the reactor; a glycerine introduction pipe having a discharge opening spaced from the opening of the acid introduction pipe but adjacent the shaft and the upper surface of the reactor, whereby nitrating acid and glycerine are introduced to the upper surface of the reactor near the center thereof, react as they move out in a thin sheet, and the reaction products are discharged from said reactor solely over the perimeter thereof onto the refrigerated wall; and means withdrawing reaction products after they have flowed down said refrigerated wall, whereby said wall is maintained free of accumulation of reaction products.

References Cited in the file of this patent

UNITED STATES PATENTS

| Number | Name | Date |
|---|---|---|
| 106,607 | Mowbray | Aug. 23, 1870 |
| 1,284,488 | Steward | Nov. 12, 1918 |
| 1,629,200 | Buhtz | May 17, 1927 |
| 1,823,582 | Bartels | Sept. 15, 1931 |
| 2,363,834 | Crater | Nov. 28, 1944 |
| 2,507,490 | Cohen | May 16, 1950 |

FOREIGN PATENTS

| Number | Country | Date |
|---|---|---|
| 482,868 | Germany | Sept. 21, 1929 |
| 504,498 | Germany | Aug. 4, 1930 |